United States Patent
Maher et al.

(10) Patent No.: US 10,731,425 B2
(45) Date of Patent: Aug. 4, 2020

(54) HIGH PRESSURE MARINE DRILLING RISER ASSEMBLED USING MECHANICAL COMPONENTS

(71) Applicant: Trendsetter Vulcan Offshore, Inc., Houston, TX (US)

(72) Inventors: James V. Maher, Houston, TX (US); Mario Lugo, Naperville, IL (US); Daniel McCelvey, Houston, TX (US)

(73) Assignee: TRENDSETTER VULCAN OFFSHORE, INC., Houston, TX (US)

( * ) Notice: Subject to any disclaimer, the term of this patent is extended or adjusted under 35 U.S.C. 154(b) by 355 days.

(21) Appl. No.: 15/680,586

(22) Filed: Aug. 18, 2017

(65) Prior Publication Data

US 2018/0051523 A1 Feb. 22, 2018

Related U.S. Application Data

(60) Provisional application No. 62/377,186, filed on Aug. 19, 2016.

(51) Int. Cl.

| | | |
|---|---|---|
| *E21B 17/08* | (2006.01) | |
| *E21B 17/01* | (2006.01) | |
| *F16L 23/04* | (2006.01) | |
| *F16L 23/036* | (2006.01) | |
| *F16L 15/08* | (2006.01) | |
| *F16L 23/02* | (2006.01) | |

(52) U.S. Cl.
CPC ............ *E21B 17/085* (2013.01); *E21B 17/01* (2013.01); *F16L 15/08* (2013.01); *F16L 23/02* (2013.01); *F16L 23/036* (2013.01); *F16L 23/04* (2013.01)

(58) Field of Classification Search
CPC ...... E21B 17/01; E21B 17/085; E21B 17/042; F16L 23/036; F16L 23/04; F16L 23/02; F16L 23/024; F16L 15/08
USPC ................................. 285/333, 334, 412, 414
See application file for complete search history.

(56) References Cited

U.S. PATENT DOCUMENTS

| | | | |
|---|---|---|---|
| 4,496,172 A * | 1/1985 | Walker | |
| 4,496,173 A * | 1/1985 | Roche | E21B 17/085 |
| 5,992,893 A * | 11/1999 | Watkins | E21B 17/085 |
| 8,528,647 B2 * | 9/2013 | Guesnon | E21B 17/085 |
| 2008/0309068 A1 * | 12/2008 | Hall | F16L 23/02 |
| 2014/0326502 A1 * | 11/2014 | Gallagher | E21B 17/085 |

* cited by examiner

*Primary Examiner* — Zachary T Dragicevich
(74) *Attorney, Agent, or Firm* — Porter Hedges LLP; Jonathan Pierce; Pierre Campanac

(57) ABSTRACT

A marine riser having a pressure level rating of twenty ksi or more includes riser tubulars and auxiliary lines that are made of steel having an API grade C110 and C125 and is NACE certified. The riser tubulars and auxiliary lines are not welded, but are assembled via threaded, clamped, stabbed or other mechanical and/or hydraulic connections. Some of the connections may be pre-assembled to reduce assembly time on the drill ship.

11 Claims, 4 Drawing Sheets

HIGH PRESSURE MARINE DRILLING RISER ASSEMBLED USING MECHANICAL COMPONENTS

CROSS-REFERENCE TO RELATED APPLICATIONS

This Application claims priority to U.S. provisional Application Ser. No. 62/377,186 filed on Aug. 19, 2016, which is incorporated herein by reference.

BACKGROUND

This disclosure relates generally to marine risers connected to Blow Out Preventer ("BOP") and used during drilling of a wellbore below the sea.

Traditional marine risers are connected to a subsea BOP. They include a central tubular as well as a series of "auxiliary" lines that provide various functionality for BOPs and risers. They are designed assuming that the BOP forms an effective pressure barrier so the risers are not required to hold pressures as high as the shut in wellbore pressure or "worst case discharge" pressure. However, new drilling systems may now utilize a surface BOP, and thus the marine risers are required to hold pressures as high as the shut in wellbore pressure. Also, in cases of failure of the subsea BOP, marine risers that hold pressures as high as the shut in wellbore pressure may provide an additional pressure barrier and may improve the safety of drilling operations.

Components for marine risers rated to pressure levels of fifteen kilo pounds per square inch ("ksi") or less are standard and are currently available off the shelf. These components are routinely assembled by welding. However, scaling up the size of these components to achieve pressure level ratings above fifteen ksi causes significant problems for the following reasons. The components become very heavy, and their handling during construction of the marine risers requires the upgrade of all handling systems on drill ships. Also, as the components become thicker, achieving uniform properties of the weld through the entire thickness becomes difficult, making testing of the welded part necessary. The rework of low quality welds becomes costly.

In addition, certain regulatory bodies now require that the materials making the components of marine risers are corrosion resistant, for example NACE certified.

Thus, there is a continuing need in the art for marine risers and components of marine risers that achieve pressure level ratings above fifteen ksi, and are corrosion resistant.

SUMMARY

This disclosure describes a riser joint for a marine riser. The riser joint comprises a tubular, a first collar having a first flange, the first flange having a plurality of through holes, and a second collar having a second flange, the second flange having a plurality of through holes. The tubular has a first threaded pin end and second threaded pin end. The first collar has a threaded box end that engages the first threaded pin end of the tubular. The second collar has a threaded box end that engages the second threaded pin end of the tubular a second collar having a threaded box end that engages the second threaded pin end of the tubular. The tubular may be made of grade C110 or C125 steel.

The riser joint also comprises at least one auxiliary line, at least one receptacle, and at least one stab. The at least one auxiliary line has a first threaded pin end and a second threaded pin end. The at least one receptacle has a threaded box end that engages the first threaded pin end of the auxiliary line. The at least one stab has a threaded box end that engages the second threaded pin end of the auxiliary line. The auxiliary line may be made of grade C110 or C125 steel.

The at least one receptacle is received in a first through hole of the plurality of through holes of the first flange. The first through hole may comprise a shoulder for retaining the at least one receptacle in the first through hole. The at least one stab is received in a second through hole of the plurality of through holes of the second flange. The second through hole may comprise a shoulder for retaining the at least one stab in the second through hole. The at least one auxiliary line may be placed in tension between the at least one stab and the at least one receptacle. The at least one stab may be configured to sealingly engage another receptacle similar to the at least one receptacle upon connection of two consecutive riser joints. Similarly, the at least one receptacle may be configured to sealingly engage another stab similar to the at least one stab upon connection of two consecutive riser joints.

In some embodiments, the tubular may comprise first and second tubes. Each of the first and second tubes may have a first and a second threaded pin ends. The tubular may further comprise a joint having first and second threaded box ends. The first threaded box end of the joint may engage the first threaded pin end of the first tube. The second threaded box end of the joint may engage the second threaded pin end of the second tube.

In some embodiments, the auxiliary line may comprise first and second pipes. Each of the first and second pipe may have a first and a second threaded pin ends. The auxiliary line may further comprise a joint having a first threaded box end and a second threaded box end. The first threaded box end of the joint may engage the first threaded pin end of the first pipe. The second threaded box end of the joint may engage the second threaded pin end of the second pipe.

This disclosure also describes a marine riser. The marine riser comprises a first tubular and a second tubular. The first tubular has a threaded pin end. A first collar having a threaded box end engages the threaded pin end of the first tubular. The second tubular has a threaded pin end. A second collar having a threaded box end engages the threaded pin end of the second tubular. The first tubular and/or the second tubular may be made of grade C110 or C125 steel.

The first collar has a first flange having a plurality of through holes. The second collar has a second flange having a plurality of through holes. At least one fastener is received through one of the plurality of through holes in the first flange and one of the plurality of through holes in the second flange. The at least one fastener may comprise a bolt and one or more nuts. Further, the first collar may comprise a first opening, and the second collar may comprise a second opening. A gasket may be sealingly engaged within the first and second opening upon fastening of the at least one fastener.

The marine riser also comprises a first auxiliary line, and a second auxiliary line. The first auxiliary line and/or the second auxiliary line may be made of grade C110 or C125 steel. A receptacle has a threaded box end that engages a threaded pin end of the first auxiliary line. A stab has a threaded box end that engages a threaded pin end of the second auxiliary line. The receptacle is received in a first through hole of the plurality of through holes of the first flange. The stab is received in a second through hole of the plurality of through holes of the second flange. The stab may be configured to sealingly engage the receptacle upon fastening of the at least one fastener.

In some embodiments, the marine riser may further comprise a ring attached to the first tubular; and a brace for clamping the first auxiliary line onto the ring.

This disclosure also describes a marine riser, comprising a first tubular, a second tubular, a first collar, and a second collar. The first tubular has a first threaded pin end. The first collar has a threaded box end that engages the first threaded pin end of the first tubular. The second tubular has a second threaded pin end. The second collar has a threaded box end that engages the second threaded pin end of the second tubular. The first tubular and/or the second tubular may be made of grade C110 or C125 steel.

The marine riser also comprises a first plate and second plate. Each of the first and second plates has a cavity. The first collar has a first bulge. The second collar has a second bulge. The cavity formed in the first and/or the second plate is configured to receive and retain the first bulge and the second bulge.

Each of the first and second plates has at least one ear. At least one fastener is configured to clamp together the ear of the first plate and the ear of the second plate. The at least one fastener may comprise a bolt and one or more nuts.

BRIEF DESCRIPTION OF THE DRAWINGS

For a more detailed description of the embodiments of the disclosure, reference will now be made to the accompanying drawings, wherein.

DETAILED DESCRIPTION

Figure 1:
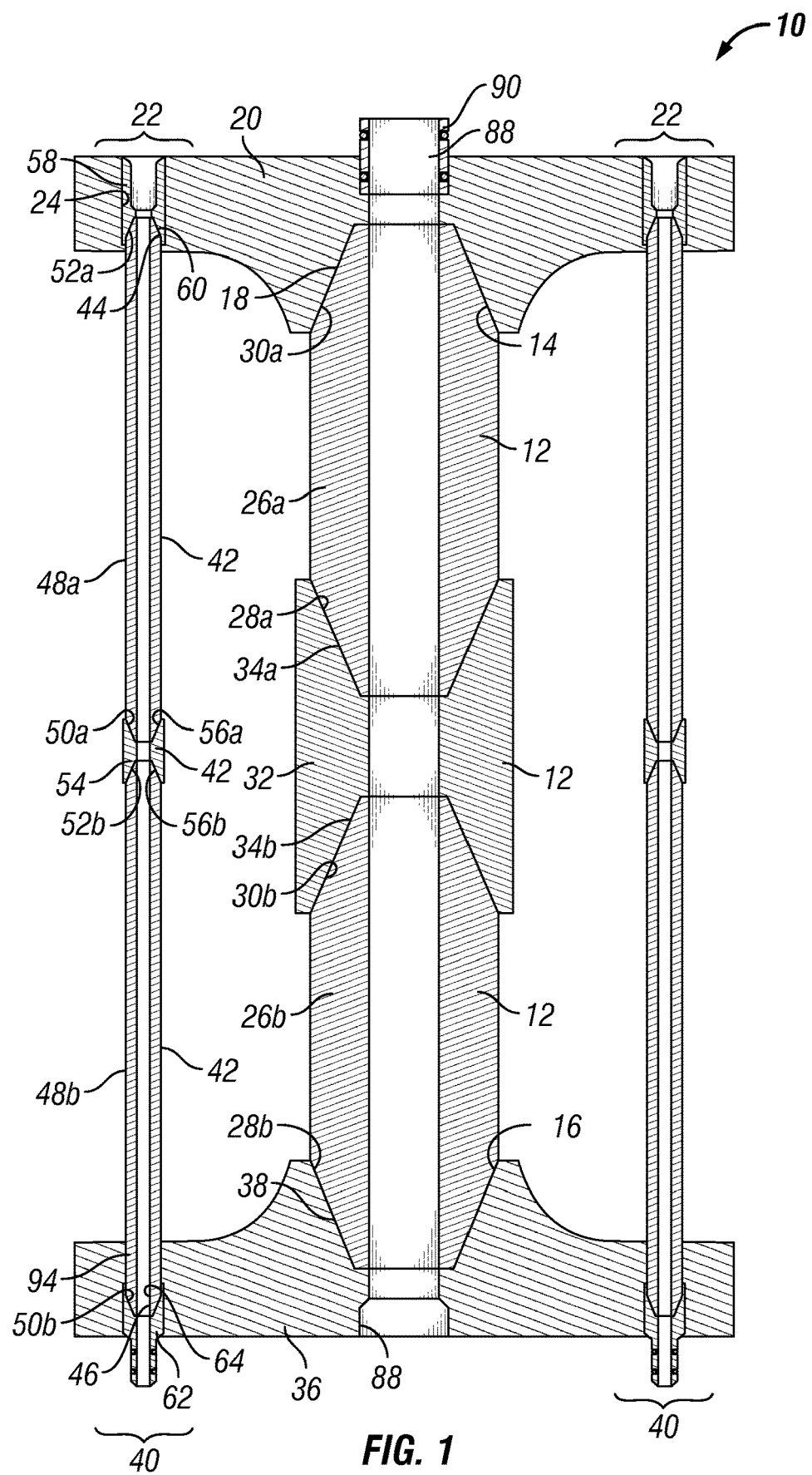
FIG. 1 is a sectional view of a riser joint for a marine riser in accordance with one embodiment.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

One option to achieve pressure level ratings above fifteen ksi is to use steels that have a much higher strength than the eighty ksi that is typical in traditional marine risers. Higher strength steels are now available. For example steels having an API grade C110 and C125 and being NACE certified are either commercially available or on the verge of being commercially available. Using these materials, a marine riser having a pressure level rating of twenty ksi or more can have the same weight as a traditional marine riser having a pressure level rating of fifteen ksi or less. Thus, riser tubulars and auxiliary lines can be made of steels having an API grade C110 and C125 and being NACE certified. Such riser tubulars and auxiliary lines may not be welded, and may require the use of threaded or mechanical connections, as described herein.

Referring initially to FIG. 1, a riser joint 10 for a marine riser comprises a tubular 12 having first and second threaded pin ends, respectively 14 and 16. In the example shown, the tubular 12 comprises first and second tubes, respectively 26*a* and 26*b*. The tube 26*a* has first and second threaded pin ends, respectively 28*a* and 30*a*. The tube 26*b* has first and second threaded pin ends, respectively 28*b* and 30*b*. The tubular 12 further comprises a joint 32 having first and second threaded box ends, respectively 34*a* and 34*b*. The first threaded box end 34*a* of the joint 32 engages the first threaded pin end 28*a* of the first tube 26*a*, and the second threaded box end 34*b* of the joint 32 engages the second threaded pin end 30*b* of the second tube 26*b*. As such, the tubular 12 may be referred to as a thread and connect type tubular, and may comprise two or more threaded tubes interconnected by threaded joints.

The riser joint 10 further comprises a first collar 20 having a threaded box end 18 that engages the first threaded pin end 14 of the tubular 12. The first collar 20 includes a first flange 22. The first flange 22 includes a plurality of through holes, for example twelve through holes, including a first through hole 24. The first collar 20 (including the flange 22) may be made as a unitary body by forging.

The riser joint 10 further comprises a second collar 36 having a threaded box end 38 that engages the second threaded pin end 16 of the tubular 12. The second collar 36 includes a second flange 40. The second flange 40 includes a plurality of through holes 94, 94a, 94b, 94c, 94d, 94e, 94f, etc. (in FIG. 2), including a second through hole 94.

The riser joint 10 further comprises an auxiliary line 42 having first and second threaded pin ends, respectively 44 and 46. In the example shown, the auxiliary line 42 comprises first and second pipes, respectively 48a and 48b. The pipe 48a has first and second threaded pin ends, respectively 50a and 52a. The pipe 48b has first and second threaded pin ends, respectively 50b and 52b. The auxiliary line 42 further comprises a joint 54 having first and second threaded box ends, respectively 56a and 56b. The first threaded box end 56a of the joint 54 engages the first threaded pin end 50a of the first pipe 48a. The second threaded box end 56b of the joint 54 engages the second threaded pin end 52b of the second pipe 48b. As such, the auxiliary line 42 may be referred to as a thread and connect type line, and may comprise two or more threaded pipes interconnected by threaded joints.

The riser joint 10 comprises a receptacle 58 having a threaded box end 60 that engages the first threaded pin end 44 of the auxiliary line 42. The receptacle 58 is received in the first through hole 24. The riser joint 10 further comprises a stab 62 having a threaded box end 64 that engages the second threaded pin end 46 of the auxiliary line 42. The stab 62 is received in the second through hole 94. In the example shown, the first through hole 24 comprises a shoulder for retaining the receptacle 58 in the first through hole 24. The second through hole 94 also comprises a shoulder for retaining the stab 62 in the second through hole 92. The shoulders in the first through hole 24 and the second through hole 94 face each other such that the auxiliary line 42 may be placed in tension between the stab 62 and the receptacle 58.

To achieve high pressure rating and be corrosion resistant, one or more of the tubular 12, the auxiliary line 42, the first collar 20, the second collar 36, the stab 62, and the receptacle 58 may be made of grade C110 or C125 steel.

Figure 2:
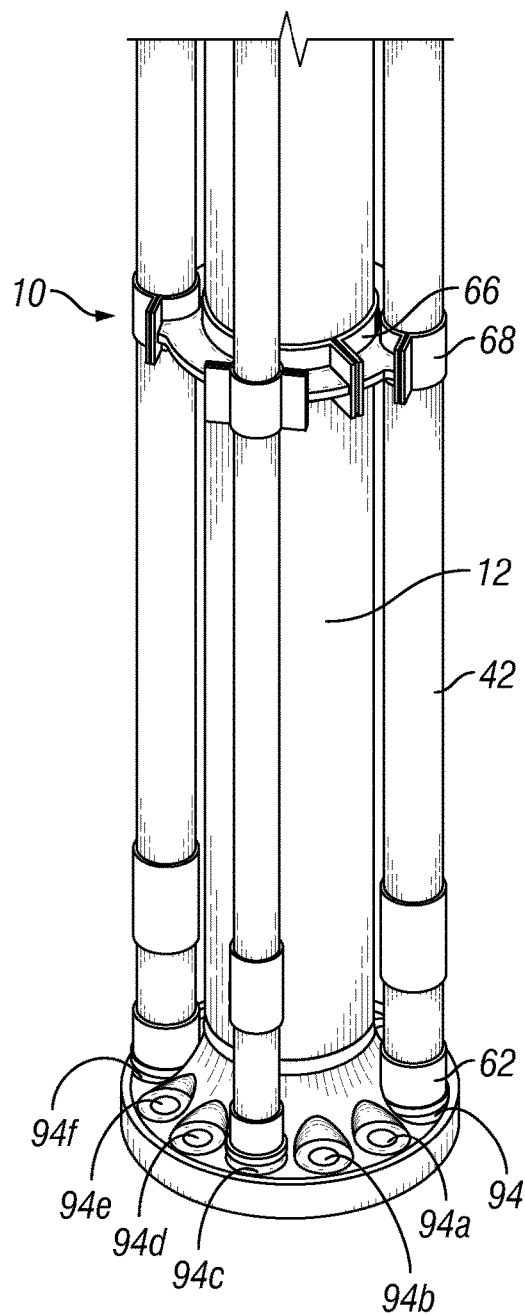
FIG. 2 is a perspective view of a portion of the riser joint shown in FIG. 1.
Figure 3:
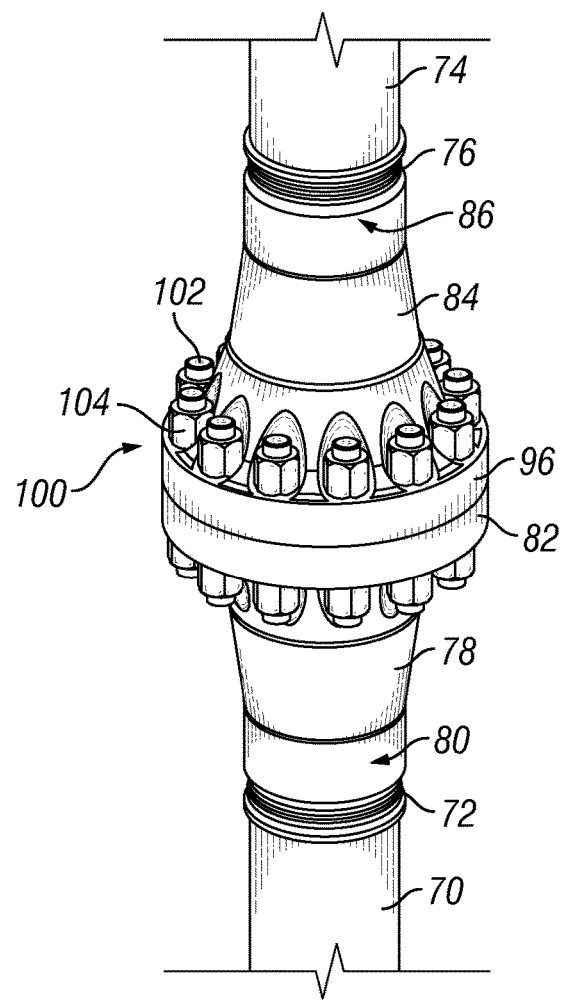
FIG. 3 is a perspective view of a portion of a marine riser assembled by coupling together first and second riser joints similar to the riser joint of FIG. 1.

While a single auxiliary line 42 is described herein in details, the riser joint 10 may include a plurality of auxiliary lines, for example four (in FIG. 2). The auxiliary lines may be identical, or may differ. For example, auxiliary lines may include a choke line and a kill line both adapted for flowing drilling mud under high pressure, and two hydraulic lines adapted for flowing hydraulic fluid to actuate functions of a subsea BOP. Further, in cases where the BOP is located at or close to sea surface, no auxiliary line may also be provided, for example as shown in FIG. 3.

In the example shown, the design of the riser joint 10 may completely eliminate welding between components, which is the primary technical problem for building marine risers rated at a pressure level of twenty ksi or higher. As auxiliary lines may no longer require welding, the auxiliary lines may be placed closer to the central tubular because they do not need to be spaced at a significant stand-off for welding.

Turning now to FIG. 2, the riser joint 10 may comprise a ring 66 attached to the tubular 12 and a brace 68 for clamping the first auxiliary line 42 onto the ring 66. The ring 66 may be made of two halves that are secured to the tubular 12. While only one ring 66 is shown in FIG. 2, more rings may be provided between the first collar 20 and the second collar 36.

The stab 62 may be configured to sealingly engage a receptacle similar to the receptacle 58 shown in FIG. 1 to establish a fluid communication across auxiliary flow lines of two consecutive joints.

Turning to FIG. 3, a portion of a marine riser in accordance with one embodiment is illustrated. The marine riser may be assembled by coupling together first and second riser joints similar to the riser joint of FIG. 1. Thus, the marine riser comprises a first tubular 70 having a threaded pin end 72, a second tubular 74 having a threaded pin end 76.

The marine riser comprises a first collar 78 having a threaded box end 80 that engages the threaded pin end 72 of the first tubular 70, the first collar 78 having a first flange 82, and the first flange 82 having a plurality of through holes. In alternative embodiments (e.g., FIG. 1), the plurality of through holes may include a first through hole. A receptacle (e.g., receptacle 58 in FIG. 1) having a threaded box end that engages the threaded pin end of an auxiliary line (e.g., auxiliary line 42 in FIG. 1) may be received in the first through hole.

The marine riser comprises a second collar 84 having a threaded box end 86 that engages the threaded pin end 76 of the second tubular 74, the second collar 84 having a second flange 96, and the second flange 96 having a plurality of through holes. In alternative embodiments (e.g., FIG. 1), the plurality of through holes may include a second through hole. A stab (e.g., stab 62 in FIG. 1) having a threaded box end that engages the threaded pin end of an auxiliary line (e.g., auxiliary line 42 in FIG. 1) may be received in the second through hole.

At least one fastener 100 is received through one of the plurality of through holes in the first flange 82 and one of the plurality of through holes in the second flange 96. In the example shown, twelve fasteners are used. However, less fastener, for example eight fasteners may be used (e.g., as shown in FIG. 2). The fasteners may comprise a bolt 102 and at least a nut 104.

To ensure adequate sealing, the first and second collars, respectively 78 and 84, may comprise first and second openings (e.g., openings 88 in FIG. 1), and a gasket (e.g., gasket 90 in FIG. 1) sealingly engaged within the first and second openings.

Figure 4:
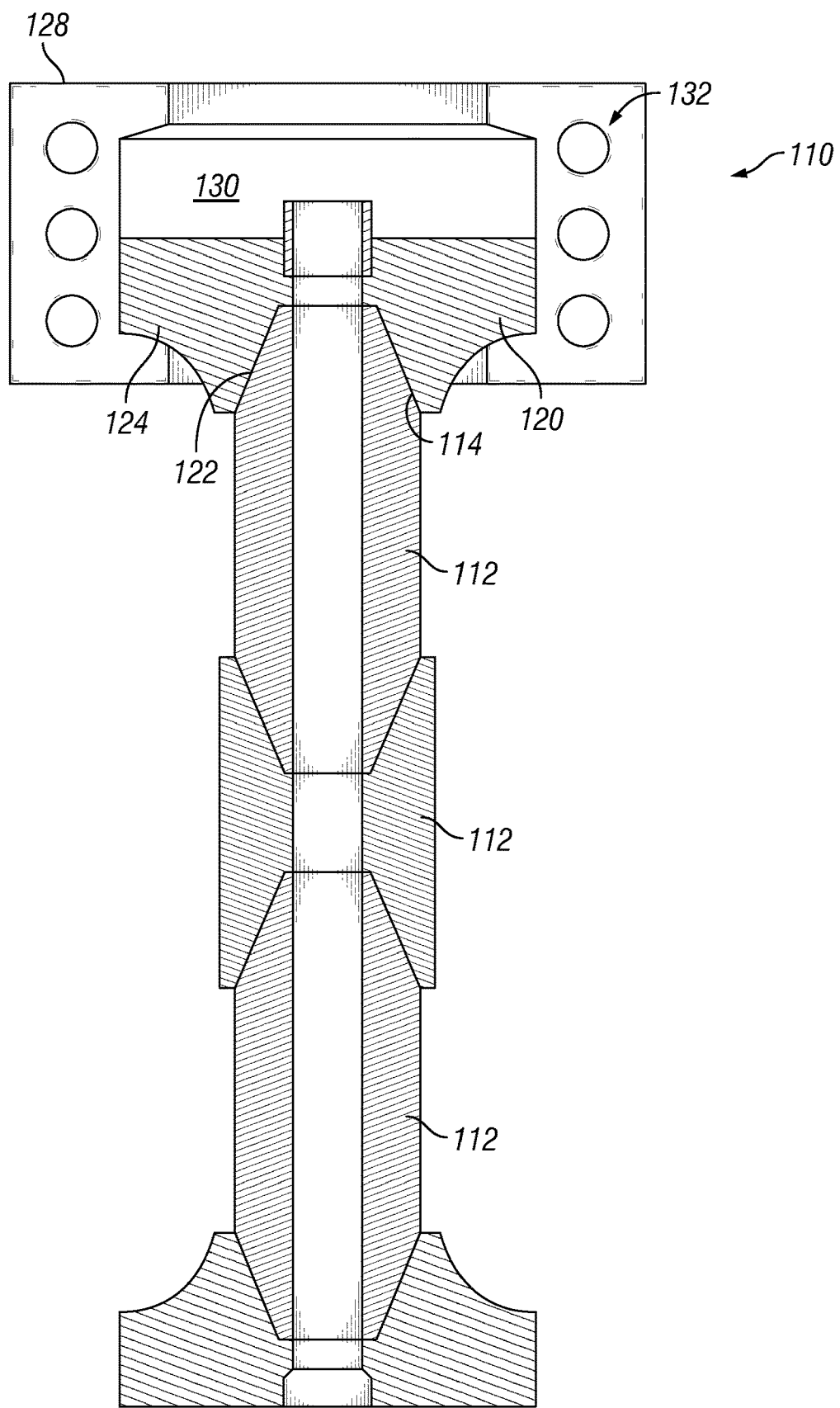
FIG. 4 is a sectional view of a riser joint for a marine riser in accordance with one embodiment.
Figure 5:
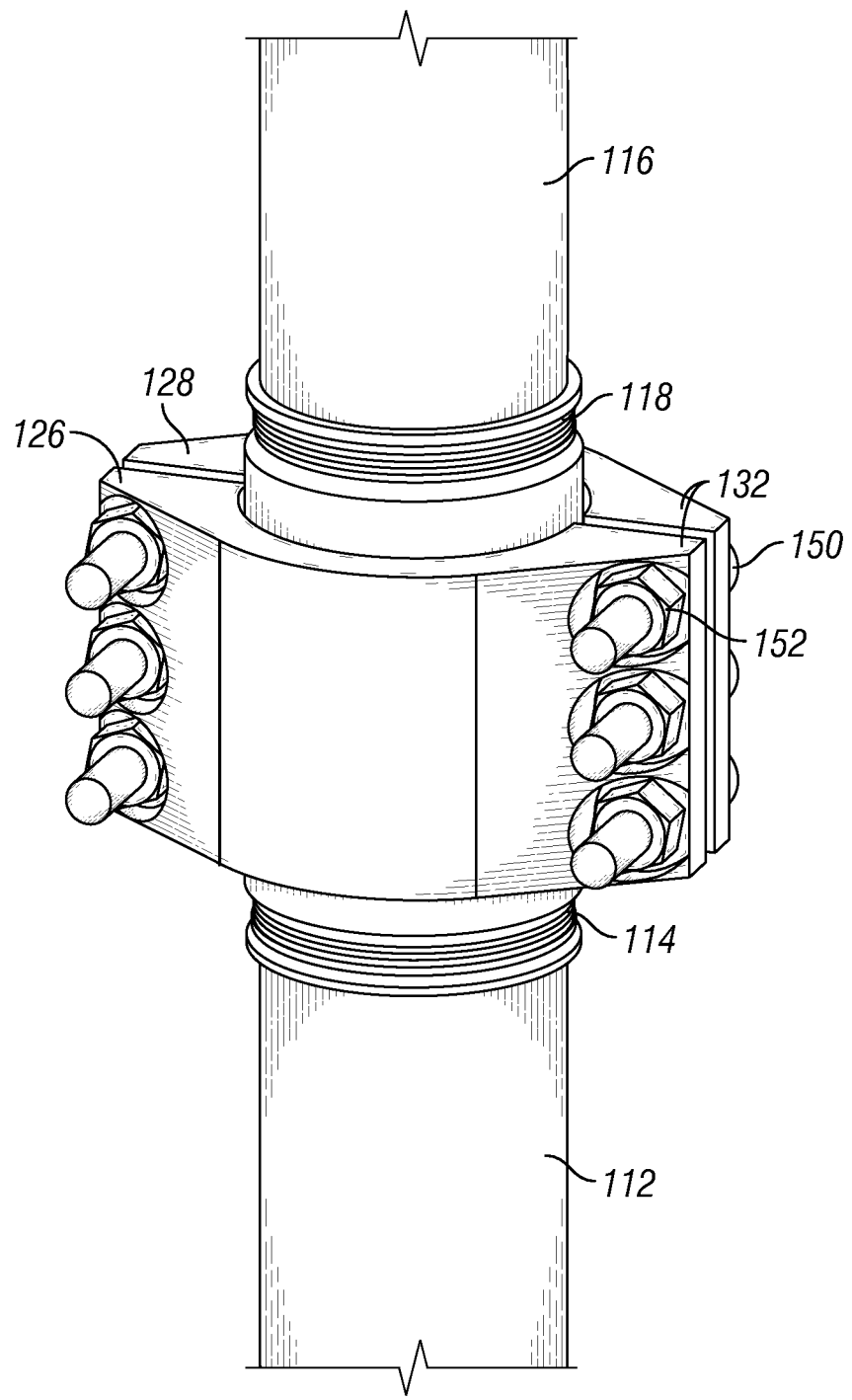
FIG. 5 is a perspective view of a portion of a marine riser assembled by coupling together first and second riser joints similar to the riser joint of FIG. 4.

Turning now to FIGS. 4 and 5, a marine riser in accordance with an embodiment is illustrated. The marine riser may be assembled by coupling together first and second riser joints similar to a riser joint 110 shown in FIG. 4.

The marine riser comprises a first tubular 112 having a first threaded pin end 114, a second tubular 116 having a second threaded pin end 118. The marine riser comprises a first collar 120 having a threaded box end 122 that engages the first threaded pin end 114 of the first tubular, the first collar 120 having a first bulge 124. The marine riser comprises a second collar that may be a mirror image of the first collar 120. The second collar has a threaded box end that engages the second threaded pin end 118 of the second tubular 116, the second collar having a second bulge.

The marine riser further comprises first and second plates, respectively 126 and 128. Each of first and second plates has a cavity 130 configured to receive and retain the first bulge 124 and second bulge. Each of first and second plates has at least one ear 132. In the example shown, each of first and second plates has two ears. At least one fastener is configured to clamp together the ears 132 of the first and second plates, respectively 126 and 128. In the example shown, three fasteners are used on each pair of ears to be clamped. The fasteners may comprise a bolt and a nut, such as bolt 150 and nut 152. The plates may be made-up and the fasteners pre-tensioned with custom tooling to reduce assembly time on the drill ship.

To achieve high pressure rating and be corrosion resistant, one or more of the first tubular 112, the first collar 120, the second tubular 116, the second collar, the first and the second plates 126 and 128 may be made of grade C110 or C125 steel.

Auxiliary lines may be added to the marine riser illustrated in FIGS. 4 and 5, for example attached as shown in FIG. 2.

While the disclosure is susceptible to various modifications and alternative forms, specific embodiments thereof are shown by way of example in the drawings and description. It should be understood, however, that the drawings and detailed description thereto are not intended to limit the disclosure to the particular form disclosed, but on the contrary, the intention is to cover all modifications, equivalents and alternatives falling within the scope of the claims.

What is claimed is:

1. A riser joint for a marine riser, comprising:
   a tubular having first and second threaded pin ends;
   a first collar having a threaded box end that engages the first threaded pin end of the tubular, wherein the first collar comprises a first opening, wherein the first collar has a first flange, the first flange having a plurality of through holes including a first through hole;
   a second collar having a threaded box end that engages the second threaded pin end of the tubular, wherein the second collar comprises a second opening, wherein the second collar has a second flange, the second flange having a plurality of through holes including a second through hole;
   a gasket configured for being sealingly engaged within the first or second opening;
   a fastener configured for coupling the first collar or the second collar to another collar;
   an auxiliary line having first and second threaded pin ends;
   a receptacle having a threaded box end that engages the first threaded pin end of the auxiliary line, the receptacle being received in the first through hole; and
   a stab having a threaded box end that engages the second threaded pin end of the auxiliary line, the stab being received in the second through hole.

2. The riser joint of claim 1, wherein the tubular comprises first and second tubes each having first and second threaded pin ends, and a joint having first and second threaded box ends, wherein the first threaded box end of the joint engages the first threaded pin end of the first tube, and the second threaded box end of the joint engages the second threaded pin end of the second tube.

3. The riser joint of claim 1, wherein the first through hole comprises a shoulder for retaining the receptacle in the first through hole.

4. The riser joint of claim 3, wherein the second through hole comprises a shoulder for retaining the stab in the second through hole.

5. The riser joint of claim 4, wherein the auxiliary line comprises first and second pipes each having first and second threaded pin ends, and a joint having first and second threaded box ends, wherein the first threaded box end of the joint engages the first threaded pin end of the first pipe, and the second threaded box end of the joint engages the second threaded pin end of the second pipe.

6. The riser joint of claim 5, wherein the auxiliary line is placed in tension between the stab and the receptacle.

7. The riser joint of claim 1, wherein the tubular is made of grade C110 or C125 steel.

8. A marine riser comprising:
   a first tubular having a first threaded pin end;
   a second tubular having a second threaded pin end;
   a first collar having a threaded box end that engages the first threaded pin end of the first tubular, wherein the first collar comprises a first opening, wherein the first collar has a first flange, the first flange having a plurality of through holes including a first through hole;
   a second collar having a threaded box end that engages the second threaded pin end of the second tubular, wherein the second collar comprises a second opening, wherein the second collar has a second flange, the second flange having a plurality of through holes including a second through hole;
   a gasket sealingly engaged within the first or second opening;
   a fastener for coupling the first collar to the second collar;
   a first auxiliary line having a threaded pin end;
   a second auxiliary line having a threaded pin end;
   a receptacle having a threaded box end that engages the threaded pin end of the first auxiliary line, the receptacle being received in the first through hole;
   a stab having a threaded box end that engages the threaded pin end of the second auxiliary line, the stab being received in the second through hole; and
   wherein the fastener is received through one of the plurality of through holes in the first flange and one of the plurality of through holes in the second flange.

9. The marine riser of claim 8, wherein the fastener comprises a bolt and a nut.

10. The marine riser of claim 8, further comprising:
    a ring attached to the first tubular; and
    a brace for clamping the first auxiliary line onto the ring.

11. The marine riser of claim 8, wherein the first and second tubulars are made of grade C110 or C125 steel.

* * * * *